US012766562B2

(12) United States Patent
Nannetti

(10) Patent No.: US 12,766,562 B2
(45) Date of Patent: Oct. 20, 2026

(54) APPARATUS FOR TRANSFERRING PHARMACEUTICAL ARTICLES INTERNALLY OF CONTAINERS WITH REJECTION OF DEFECTIVE PHARMACEUTICAL ARTICLES

(71) Applicant: Marchesini Group S.P.A., Pianoro (IT)

(72) Inventor: Simone Nannetti, Grizzana Morandi (IT)

(73) Assignee: Marchesini Group S.P.A, Pianoro (IT)

( * ) Notice: Subject to any disclaimer, the term of this patent is extended or adjusted under 35 U.S.C. 154(b) by 132 days.

(21) Appl. No.: 18/833,607

(22) PCT Filed: Jan. 30, 2023

(86) PCT No.: PCT/IB2023/050794
§ 371 (c)(1),
(2) Date: Jul. 26, 2024

(87) PCT Pub. No.: WO2023/148603
PCT Pub. Date: Aug. 10, 2023

(65) Prior Publication Data
US 2025/0242384 A1 Jul. 31, 2025

(30) Foreign Application Priority Data
Feb. 2, 2022 (IT) ........................ 102022000001739

(51) Int. Cl.
*B07C 5/36* (2006.01)
*B07C 5/342* (2006.01)

(52) U.S. Cl.
CPC ............ *B07C 5/362* (2013.01); *B07C 5/3422* (2013.01)

(58) Field of Classification Search
CPC .......... B07C 5/362; B07C 5/3422; B07C 5/36
See application file for complete search history.

(56) References Cited

U.S. PATENT DOCUMENTS

2004/0007442 A1* 1/2004 Monti ..................... B07B 13/04 198/538
2009/0090659 A1* 4/2009 Monti ..................... B65B 57/14 209/587

(Continued)

FOREIGN PATENT DOCUMENTS

CN 111703658 A * 9/2020 ............. B65B 57/20
DE 3841678 A1 6/1990

(Continued)

OTHER PUBLICATIONS

International Search Report and Written Opinion for PCT Patent App. PCT/IB2023/050794, dated Apr. 20, 2023, 9 pages.

*Primary Examiner* — Gene O Crawford
*Assistant Examiner* — Abby A Jorgensen
(74) *Attorney, Agent, or Firm* — Jacob M. Ward; Ward Law Office LLC

(57) ABSTRACT

The apparatus for transferring pharmaceutical articles internally of containers with rejection of defective pharmaceutical articles, comprises: a series of transport channels for conveying pharmaceutical articles into a fall zone; at least a detection unit of the intactness of the pharmaceutical articles; a series of conveying conduits in the fall zone each arranged with the respective upper inlet opening inferiorly of the end of the transport channels defining a manoeuvring space comprised between the end of the transport channels and the upper inlet opening of the conveyor conduit. For each transport channel and each respective conveyor conduit, a reject unit is arranged in the manoeuvring space and positionable in either of first or second operating positions. In the first operating position, pharmaceutical articles are recognised as intact to fall into the conveyor conduit leading toward a container. In the second operating position, pharmaceutical articles are recognised as defective.

6 Claims, 2 Drawing Sheets

(56) References Cited

U.S. PATENT DOCUMENTS

| | | | | |
|---|---|---|---|---|
| 2010/0258405 | A1* | 10/2010 | Ackley | B07C 5/36<br>198/341.03 |
| 2013/0269831 | A1* | 10/2013 | Monti | B65B 5/103<br>141/94 |
| 2018/0017506 | A1* | 1/2018 | Monti | G01N 21/27 |
| 2020/0399074 | A1* | 12/2020 | Heim | B65B 57/14 |
| 2022/0267036 | A1* | 8/2022 | Shah | B07C 5/342 |
| 2022/0280981 | A1* | 9/2022 | Timperio | B07C 5/36 |

FOREIGN PATENT DOCUMENTS

| | | | | |
|---|---|---|---|---|
| DE | 3841678 | C2 * | 9/1997 | B07C 5/362 |
| EP | 3753871 | B1 * | 8/2023 | B65B 57/14 |
| IT | 202100014834 | A1 * | 12/2022 | B65G 27/04 |
| WO | WO-2018078613 | A1 * | 5/2018 | B65B 57/14 |
| WO | WO-2024011192 | A2 * | 1/2024 | B65G 47/519 |

* cited by examiner

APPARATUS FOR TRANSFERRING PHARMACEUTICAL ARTICLES INTERNALLY OF CONTAINERS WITH REJECTION OF DEFECTIVE PHARMACEUTICAL ARTICLES

FIELD OF THE INVENTION

The present invention relates to the technical sector relating to the packaging of pharmaceutical articles, such as, for example tablets, capsules, caps etc. internal of relative containers, such as for example bottles.

In particular, the invention concerns an apparatus configured for transferring pharmaceutical articles internally of respective containers, with rejection of defective articles, i.e. able to carry out the rejection of those articles that have been identified as defective and that, consequently, must not be transferred and inserted internally of the containers.

DESCRIPTION OF THE PRIOR ART

In the sector of packaging of pharmaceutical articles, it is known that defective articles must be prevented from being inserted into the packages destined for sale.

In the case of packaging system (pharmaceutical articles such as tablets, capsules, caps, and the like, internally of relative bottles, various ways are know for verifying the intactness thereof, which are substantially based on various functioning modes, for example the detection of the shape and/or dimension of the articles, the detection of the composition of the ingredients, the colour, etc.

These detection and verification methods are directed to providing a datum that can be used to decide whether the article that is to be inserted in a bottle is or is not intact, and, in a case in which it is not intact, this particular article must be rejected and therefore not be inserted in the bottle.

In fact, in the opposite case, it will be necessary to proceed with the rejection of the whole bottle, and therefore also of numerous perfectly intact pharmaceutical articles already transferred internally of the bottle.

A prior-art apparatus for transferring pharmaceutical articles, such as tablets, capsules and the like, internally of relative containers, such as bottles, and predisposed to carry out the rejection of articles recognised as defective is described in document US2020/0399074.

The apparatus described in this document comprises a vibrating conveyor comprising a series of transport channels of the pharmaceutical articles.

The transport channels, which generally have a V-shape, receive the pharmaceutical articles from a feed hopper, and are destined to transport, through a vibrating motion, the pharmaceutical articles in a transport direction, moving them away from one another and arranging them in a line, towards an end thereof.

Beyond the end of the transport channels, a fall zone is located for the pharmaceutical articles: when a pharmaceutical article, due to the vibrating motion of the transport channels of the vibrating conveyor, passes beyond the end of the transport channel, it falls by force of gravity in a downwards direction.

The apparatus also comprises a series of conveying channels for the fall of the pharmaceutical articles which are substantially constituted by hollow tubular elements having a upper opening, for inlet of the pharmaceutical articles falling from the transport channels, and a lower opening, for outlet of the pharmaceutical articles, and unloading the pharmaceutical articles into a bottle arranged beneath the conveying channel.

The various conveying channels are arranged in such a way that the respective upper opening is positioned in the fall zone, in a position beneath the falling end of respective transport channels of the vibrating conveyor.

In this way, the pharmaceutical articles which pass beyond the end of the transport channels fall into the conveying channels and therefrom are conveyed, by force of gravity, internally of relative bottles.

This apparatus further comprises a detection unit of the intactness of the pharmaceutical articles.

The detection unit is arranged in a position above the vibrating conveyor in an area in proximity of the ends of the transport channels, and thus substantially above and in proximity of the fall zone.

The detection unit is designed to detect whether the pharmaceutical articles, advancing along the transport channels towards the end of the transport channels, and therefore towards the fall zone, are more or less intact.

The apparatus further comprises a reject unit, which is drivable in a case in which the detection unit detects a presence of a defective article advancing along a transport channel towards the falling end.

The reject unit substantially comprises a covering element of the upper opening of the conveying channels.

The covering element, which is constituted substantially by a plate, or a hatch door, is movable, for example by rotation, or by translation, from a non-active position, in which the covering element is distant from the end of the transport channels, and therefore distant from the fall zone and from the upper opening of the conveying channels, to an active position, in which the covering element is positioned connected to the end of the transport channels, into a position above the upper opening and of the conveying channel and covering it.

When the covering element is positioned in the active position, it thus constitutes a prolongation due to the vibrating motion of the transport channels of the vibrating conveyor.

In this way, the pharmaceutical article detected as being defective, having passed beyond the end of the transport channel, will not be able to fall into the fall zone and thus in the conveying channel, but will be supported by the covering element.

Once the defective article reaches to above the covering element positioned in the active position, it will no longer be subject to the vibrating action of the transport channel, and will therefore be subject to halting.

For the removal of the defective article, the reject unit also comprises a suction element which is activatable to aspirate the defective pharmaceutical article once it has reached to above the covering element.

Therefore, after the pharmaceutical article has been aspirated, the covering element is moved and returned, following the translation or rotation, into the non-active position thereof, moved away and distant from the end of the transport channels, therefore distant from the fall zone and from the upper opening of the conveying channels.

An apparatus like this will however have various drawbacks.

Firstly, as the pharmaceutical articles are transported one following another along the transport channels, when the suction element is activated to aspirate a defective article reaches to above the covering element positioned in the active position, it is possible for the aspirating action also to aspirate the pharmaceutical articles immediately upstream of the defective article, i.e. those which are located at or in proximity of the end of the transport channel, and which are possibly entirely intact.

Therefore, the act of rejection can also lead to the rejection of perfectly intact pharmaceutical articles, which were destined to be inserted in the bottle.

Further, once the defective article has been aspirated by the covering element, the covering element must be re-positioned in the non-active position thereof, be moved away and distant from the end of the transport channels, so as to free the fall zone.

The movement of the covering element, for example carried out by rotation thereof, can lead to striking successive pharmaceutical articles which in the meantime are transported by the transport channel into the fall zone, beyond the end of the transport channel.

For this purpose, to avoid this circumstance, in document US2020/0399074 the need is specified to need to have recourse to the halting of the transport of the pharmaceutical articles of that particular transport channel in which the presence of a defective article has been detected, for all the time necessary to position the covering element in the active position, carry out the aspiration following the activation of the suction element, and the re-positioning of the covering element in the non-active position thereof, moved away from the end of the transport channels.

This doubtless leads to complications in the activation of the vibrating conveyor, as well as to repercussions on productivity.

SUMMARY OF THE INVENTION

The aim of the present invention is therefore to provide an apparatus for transferring pharmaceutical articles internally of containers with rejection of defective pharmaceutical articles able to obviate the drawbacks present in the prior-art apparatuses described in the foregoing.

In particular, an aim of the present invention is to provide an apparatus able to carry out the single rejection of defective articles in a rapid and effective way, i.e. able to carry out the rejection only of those articles that have been identified as defective, thus guaranteeing that all the articles recognised as intact and valid can be transferred internally of relative containers.

The above aims are attained with an apparatus for transferring pharmaceutical articles internally of containers with rejection of defective pharmaceutical articles according to the contents of the claims.

BRIEF DESCRIPTION OF THE DRAWINGS

The characteristics of a preferred, but not exclusive, embodiment of the apparatus of the present invention will be described in the following with reference to the appended tables of drawings, in which.

DESCRIPTION OF PREFERRED EMBODIMENTS

Figure 2:
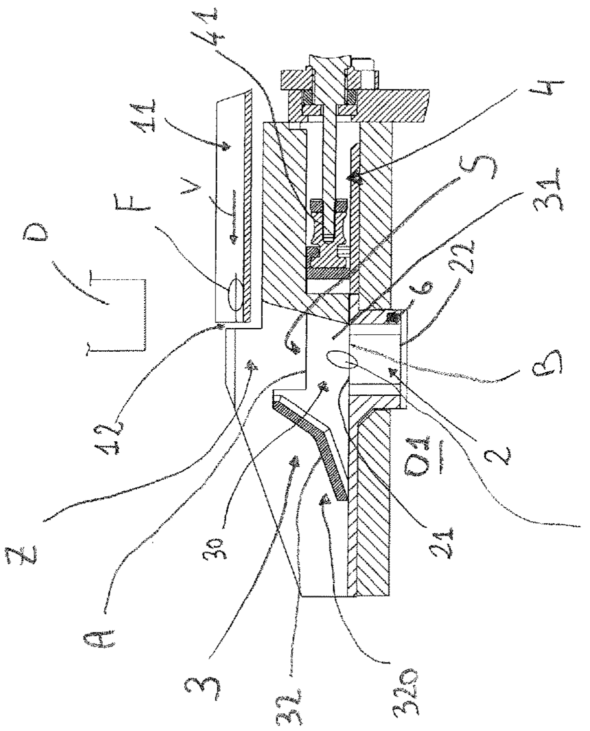
FIG. 2 is a view along vertical transversal section plane I-I of FIG. 1, which illustrates the situation in which the articles recognised as intact, and transported by a transport channel of a vibrating conveyor, are transferred towards a respective container (not illustrated)
Figure 1:
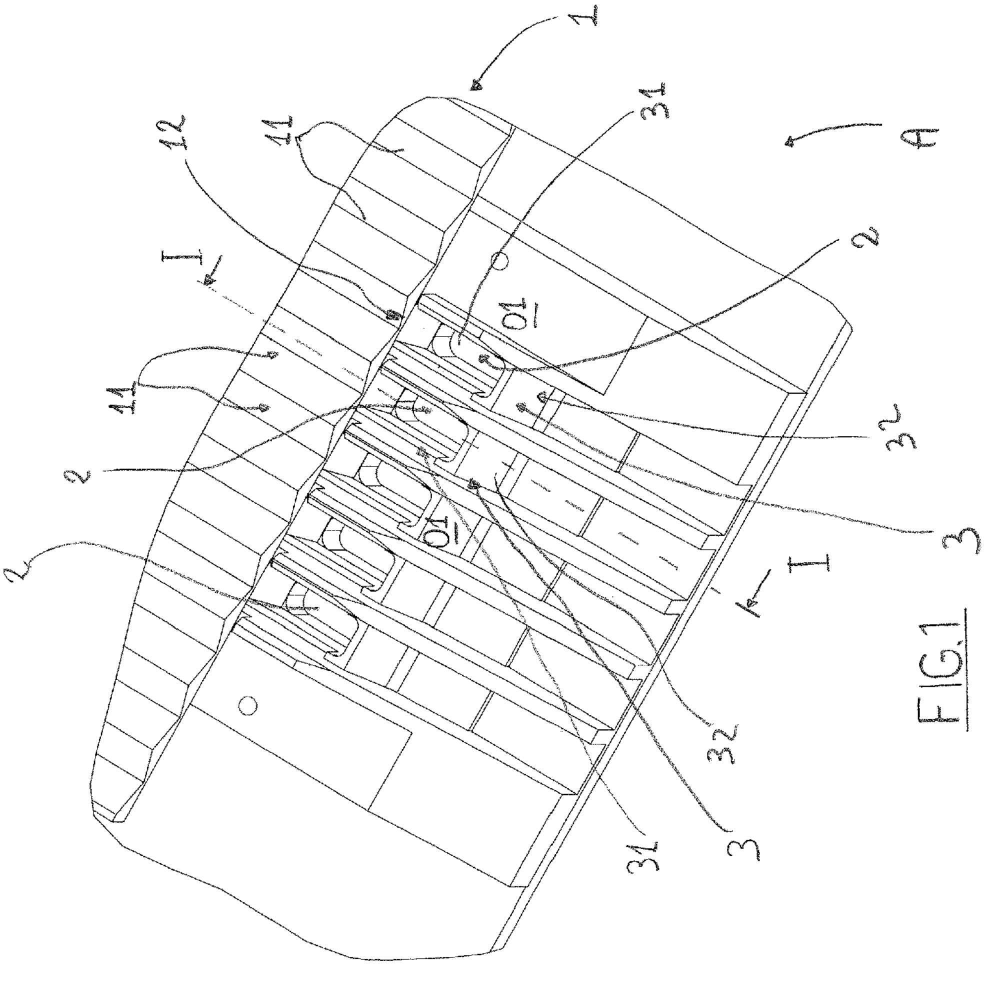
FIG. 1 illustrates, in a partial schematic perspective view, some relevant components of the apparatus of the invention for transport of pharmaceutical articles and transfer thereof towards relative containers (not illustrated), in a further possible operating configuration in which the articles detected as intact can be transferred towards the containers.

With reference to the appended tables of drawings, reference numeral (A) denotes the apparatus for transfer of pharmaceutical articles internally of containers, with rejection of the defective pharmaceutical articles of the present invention, in its entirety.

The apparatus (A) comprises a vibrating conveyor means (1) comprising a series of transport channels (11) which are configured and adapted to receive pharmaceutical articles (F) and to convey the pharmaceutical articles (F) in a transport direction (V), arranging them in a row one behind another, at a fall zone (Z) which is situated beyond an end (12) of the transport channels (11), and at least a detection unit (D) of the intactness of the pharmaceutical articles, which is arranged in a position above the conveyor means (1) and in proximity of the ends (12) of the transport channels (11) and configured to detect the intactness of the pharmaceutical articles which are moving towards the ends (12) of the transport channels (11) and therefore moving towards the fall zone (Z).

The transport channels (11) have substantially a V shape and receive the pharmaceutical articles from a feed hopper (not illustrated in the figures as of known type and not pertinent to the invention).

More than one detection unit can also be provided, for example one for each transport channel.

The detection unit (D) can be realised in various ways, on the basis of the ways selected to detect and verify the intactness of the pharmaceutical articles, for example it can be constituted by optical sensors, such as for example video cameras, able to detect the shape and dimensions, in 2D or even in 3D, of the pharmaceutical articles, used singly or, possibly, in combination with other types of sensors or even for example with laser ray emitting devices.

The detection unit (D) can also include reconstructing colour images of the pharmaceutical articles, or can be also able to detect the components present in the pharmaceutical articles.

The data acquired will then be compared with reference data indicative of intact pharmaceutical articles, and the detection unit (D) is therefore able to provide a datum if the pharmaceutical articles which are nearing the end of the transport channels are intact, and thus destined to be transferred into respective containers, or defective ones, and which therefore must not be transferred internally of the containers.

The apparatus (A) also comprises a series of conveying conduits (2) of pharmaceutical articles (F) arranged in the fall zone (Z), in which each conveyor conduit (2) comprises an upper inlet opening (21) and a lower outlet opening (22).

The peculiarities of the apparatus of the present invention consist in the fact that each conveyor conduit (2) of the series of conveying conduits (2) is arranged in such a way that the respective upper inlet opening (21) is positioned inferiorly of and beneath the end (12) of the transport channels (11) in such a way as to define, for each transport channel (11), a manoeuvring space (S) which is comprised between the end (12) of the transport channels (11) and the upper inlet opening (21) of the conveyor conduit (2), and in such a way that the lower outlet opening (22) is arranged above a respective container (not illustrated in the figures) to be filled, wherein each conveyor conduit (2) is configured and adapted to receive, through the upper inlet opening (21), the pharmaceutical articles (F) falling from the end of a respective transport channel (11) and to convey the pharmaceutical articles (F) by force of gravity to the lower outlet opening (22) for unloading the pharmaceutical articles (F) into a container.

Further, the apparatus comprises, for each transport channel (11) and for each respective conveyor conduit (2), a reject unit (3) which is arranged in the manoeuvring space (S) comprised between the end (12) of the transport channel (11) and the upper inlet opening (21) of the conveyor conduit (2) and which is realised in the following way.

Each reject unit (3) is conformed in such a way as to comprise a main body (30), internally hollow and such as to define a passage channel (31) passing vertically through the main body (30), with an entry mouth (A) and an outlet mouth (B), and having a lateral wall (32) shaped with a descending inclined profile (320).

Figure 4:
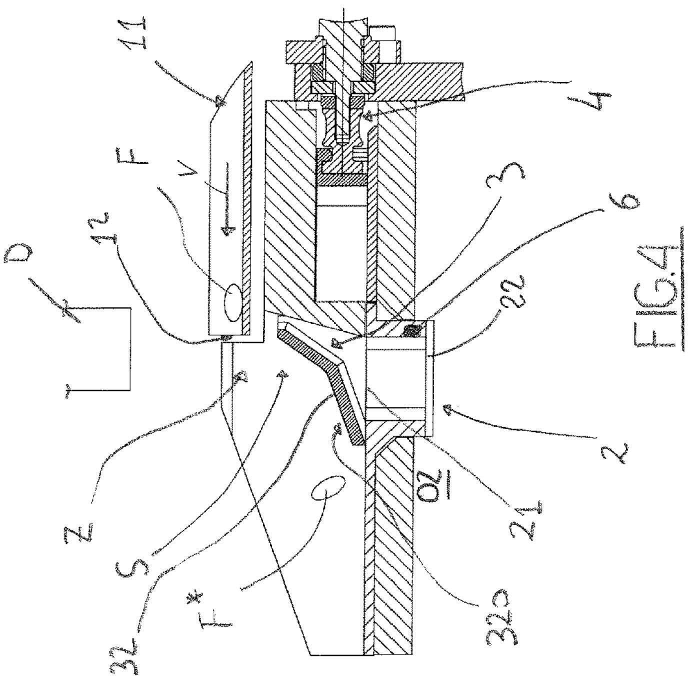
FIG. 4 is a view along vertical transversal section plane II-II of FIG. 3, which illustrates the situation in which a single article detected as defective is prevented from falling and transfer towards a respective container as it is switched towards a collection area of defective articles.
Figure 3:
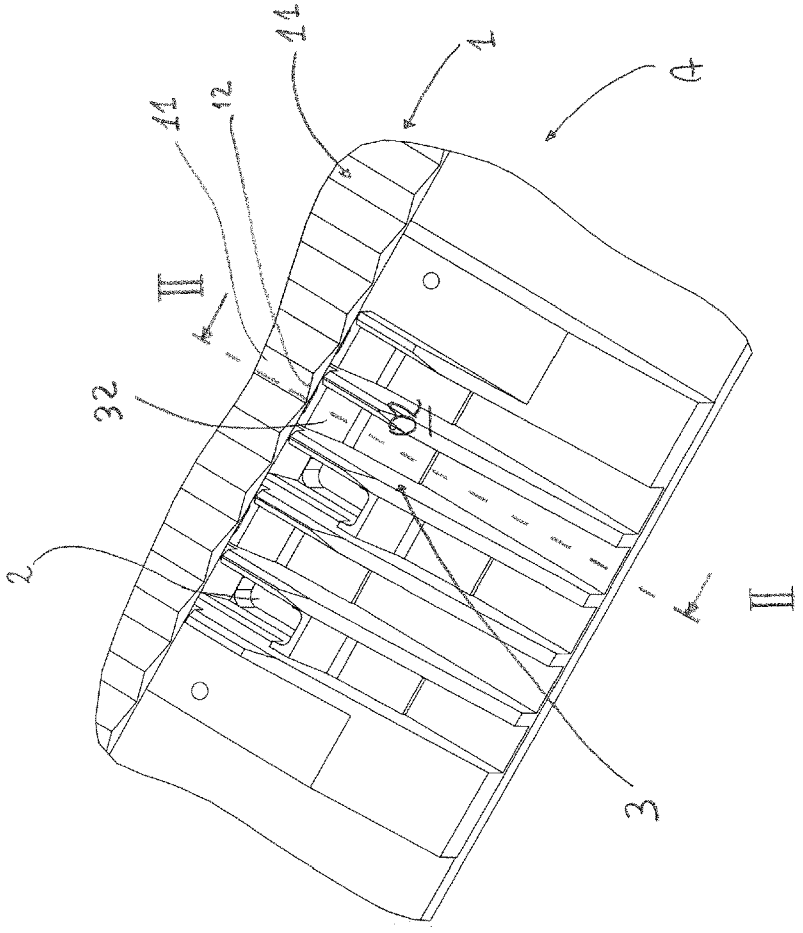
FIG. 3 illustrates, in a partial schematic perspective view, the components of the apparatus of the invention of FIG. 1 in a further possible operating configuration in which single articles detected as defective and transported by a relative transport channel are prevented from falling and transfer towards a respective container as they are switched towards a collection area of defective articles.

The apparatus (A) is configured in such a way that each reject unit (3) is drivable in alternating translation in the manoeuvring space (S) in such a way as to be positionable:

in a first operating position (O1), in which the internally hollow main body (30) is positioned with the inlet mouth (A) of the through-channel (31) positioned beneath the end of the transport channel (11) and with the outlet mouth (B) of the through-channel (31) positioned superiorly of the upper inlet opening (21) of the conveyor conduit (2) in such a way that a pharmaceutical article (F) recognised by the detection unit (D) as intact, and which has fallen from the end (12) of the respective transport channel (11), can cross the through-channel (31) and enter the conveyor conduit (2) in order to be transferred and inserted into a respective container (see for example FIG. 2), or in a second operating position (O2), in which the lateral wall (32) shaped with a descending inclined profile (320) is positioned beneath the end (12) of the transport channel (11) in such a way that a pharmaceutical article (F*) recognised by the detection unit (D) as defective, and which has fallen from the end (12) of the respective transport channel (11), can abut the descending inclined profile (320) of the lateral wall (32) and be deviated towards an accumulation area of defective pharmaceutical articles (see for example FIG. 4).

Regarding this, the apparatus has a suitable control unit (not illustrated in the figures) interfaced with the various detection units to manage the information provided by the detection units and thus to intervene on the various reject units in order to position them in the first or second operating position as a function of the information received from the respective detection unit or less of the pharmaceutical articles falling from the ends of the respective transport channels.

In this way, for each of the transport channels (11), as long as the detection unit (D) detects that a pharmaceutical article which is reaching the respective end (12) is an intact pharmaceutical article (F), the reject unit (3) can be maintained in the first operating position (O1) (FIG. 2) so that the intact article, having passed beyond the end (12) and having fallen by force of gravity, can cross the passage channel (31) and enter the conveyor conduit (2) to be transferred and inserted into a respective container.

Instead, as soon as the detection unit (D) detects that a pharmaceutical article which is reaching the end (12) of the transport channel (11) is a defective pharmaceutical article (F*), then the reject unit (3) can be translated and positioned in the second operating position (O2) (FIG. 4) in such a way that the defective pharmaceutical article (F*), once having fallen from the end (12) of the transport channel (11), can abut the descending inclined profile (320) of the lateral wall (32) and be deviated towards an accumulation area of defective pharmaceutical articles, without in any way entering the conveyor conduit (2).

Thus the rejection takes place after the defective article has fallen from the end (12) of the transport channel (11) and via the descending inclined profile (320) of the lateral wall (32), without the need to have to use movable elements to be positioned in a joining position with the ends of the transport channels for preventing the fall of the defective pharmaceutical articles an thus have recourse to external removal elements, having a suction action, as occurs in the known type apparatus of document US2020/0399074, mentioned in the foregoing.

Further, should there be more than one defective pharmaceutical article, i.e. in a case where there are two or more defective articles one following another along a transport channel, the respective reject unit can be maintained always positioned in the second operating position, thus having the certainty of always carrying out the rejection of the defective articles, without the risk that one or more thereof might in any case end up in the conveyor conduit and therefore into a container.

Therefore, the apparatus of the invention is able to carry out, in a certain and effective way, the rejection of all the single defective pharmaceutical articles that pass beyond and fall from the end of the transport channels.

Further advantageous aspects of the apparatus of the invention are described in the following.

In a preferred aspect, the lateral wall (32) shaped with a descending inclined profile (320) of each reject unit (3) has a concave sliding surface, so as to facilitate the sliding and directing of the defective pharmaceutical article towards the accumulation area of the defective articles.

On the basis of a further preferred aspect, the apparatus is made in such a way as to comprise, for each reject unit (3), a respective linear driving actuator (4) positioned at a side of the manoeuvring space (S) and connected to the main body (30) of a respective reject unit (3), on the opposite side of the lateral wall (32) shaped with a descending inclined profile (320), wherein the linear driving actuator (4) is configured, on the basis of the detection carried out by the detection unit (D):

to drive the reject unit (3) in translation and to position the reject unit (3) in the first operating position (O1), when the detection unit (D) has detected that a pharmaceutical article which is reaching the end (12) of the transport channel is intact;

to maintain the reject unit (3) in the first operating position (O1) as long as the detection unit (D) detects that a pharmaceutical article which is reaching the end (12) of the transport channel is intact;

to drive the reject unit (3) in translation and to position the reject unit (3) in the second operating position (O2), when the detection unit (D) has detected that a pharmaceutical article which is reaching the end (12) of the transport channel is defective;

to maintain the reject unit (3) in the second operating position (O2) as long as the detection unit (D) detects that a pharmaceutical article which is reaching the end (12) of the transport channel is defective.

The linear driving actuator (4) preferably comprises a pneumatic or hydraulic alternating piston (41).

In a further preferred aspect, the apparatus (A) can be provided, for each conveyor conduit (2), of a detection sensor (6) of the passage of a pharmaceutical article along the conveyor conduit (2).

The detection sensor (6) substantially performs a control function of the correct carrying-out of the act of rejection carried out by the movement and positioning of the reject unit into the second operating position (O2). When the reject unit is positioned in the second operating position (O2) (rejection position), the detection sensor should not detect any fall of articles.

In the opposite case, i.e. in the case of detection of a fall of an article internally of the conveyor conduit (2), this would mean that the act of rejection, for any reason, had not been carried out in the correct way and that therefore a defective article had fallen along the conveyor conduit up to the container, which, in this eventuality, would have to be rejected.

It is specified that, although the apparatus of the invention has been described with reference to the packaging of pharmaceutical articles, it can also be used for the packaging of para-pharmaceutical/comestible articles (for example in the form of tablets, capsules, pastilles, lozenges, pills, etc.) into relative containers, in the cases in which, for this type of articles, it is necessary to carry out a prior control of intactness and compliance, and thus carry out the individual rejection of the defective ones, preventing them from being inserted in the respective containers together with the intact and compliant articles.

The invention claimed is:

1. An apparatus for transferring pharmaceutical articles internally of containers with rejection of defective pharmaceutical articles, comprising:

a vibrating conveyor means comprising a series of transport channels which are configured and adapted to receive pharmaceutical articles and to convey the pharmaceutical articles in a transport direction, arranging them in a row one behind another, at a fall zone which is situated beyond an end of the transport channels;

at least a detection unit of the intactness of the pharmaceutical articles, which is arranged in a position above the conveyor means and in proximity of the ends of the transport channels and configured to detect the intactness of the pharmaceutical articles which are moving towards the ends of the transport channels and therefore moving towards the fall zone;

a series of conveying conduits of pharmaceutical articles arranged in the fall zone, wherein each conveyor conduit comprises an upper inlet opening and a lower outlet opening;

each conveyor conduit of the series of conveying conduits is arranged in such a way that the respective upper inlet opening is positioned inferiorly of and beneath the end of the transport channels in such a way as to define, for each transport channel, a manoeuvring space which is comprised between the end of the transport channels and the upper inlet opening of the conveyor conduit, and in such a way that the lower outlet opening is arranged above a respective container to be filled, wherein each conveyor conduit is configured and adapted to receive, through the upper inlet opening, the pharmaceutical articles falling from the end of a respective transport channel and to convey the pharmaceutical articles by force of gravity to the lower outlet opening for unloading the pharmaceutical articles into a container, and in that for each transport channel and for each respective conveyor conduit, a reject unit is arranged in the manoeuvring space comprised between the end of the transport channel and the upper inlet opening of the conveyor conduit and which is conformed in such a way as to comprise a main body, internally hollow and such as to define a through-channel passing vertically through the main body, with an inlet mouth and an outlet mouth, and having a lateral wall shaped with a descending inclined profile, wherein the reject unit is drivable in alternating translation in the manoeuvring space in such a way as to be positionable:

in a first operating position, wherein the internally hollow main body is positioned with the inlet mouth of the through-channel positioned beneath the end of the transport channel and with the outlet mouth of the through-channel positioned superiorly of the upper inlet opening of the conveyor conduit in such a way that a pharmaceutical article recognised by the detection unit as intact, and which has fallen from the end of the respective transport channel, can cross the through-channel and enter the conveyor conduit in order to be transferred and inserted into a respective container, or in a second operating position, wherein the lateral wall shaped with a descending inclined profile is positioned beneath the end of the transport channel in such a way that a pharmaceutical article recognised by the detection unit as defective, and which has fallen from the end of the respective transport channel, can abut the descending inclined profile of the lateral wall and be deviated towards an accumulation area of defective pharmaceutical articles.

2. The apparatus as claimed in claim 1, wherein the lateral wall shaped with a descending inclined profile of each reject unit has a concave sliding surface.

3. The apparatus as claimed in claim 1, comprising, for each reject unit, a respective linear driving actuator positioned at a side of the manoeuvring space and connected to the main body of a respective reject unit, on the opposite side of the lateral wall shaped with a descending inclined profile, wherein the linear driving actuator is configured, on the basis of the detection carried out by the detection unit:

to drive the reject unit in translation and to position the reject unit in the first operating position, when the detection unit has detected that a pharmaceutical article which is reaching the end of the transport channel is intact;

to maintain the reject unit in the first operating position as long as the detection unit detects that a pharmaceutical article which is reaching the end of the transport channel is intact;

to drive the reject unit in translation and to position the reject unit in the second operating position, when the detection unit has detected that a pharmaceutical article which is reaching the end of the transport channel is defective;

to maintain the reject unit in the second operating position as long as the detection unit detects that a pharmaceutical article which is reaching the end of the transport channel is defective.

4. The apparatus as claimed in claim 3, wherein the linear driving actuator comprises a pneumatic or hydraulic alternating piston.

5. The apparatus as claimed in claim 2, comprising, for each reject unit, a respective linear driving actuator positioned at a side of the manoeuvring space and connected to the main body of a respective reject unit, on the opposite side of the lateral wall shaped with a descending inclined profile, wherein the linear driving actuator is configured, on the basis of the detection carried out by the detection unit:

to drive the reject unit in translation and to position the reject unit in the first operating position, when the detection unit has detected that a pharmaceutical article which is reaching the end of the transport channel is intact;

to maintain the reject unit in the first operating position as long as the detection unit detects that a pharmaceutical article which is reaching the end of the transport channel is intact;

to drive the reject unit in translation and to position the reject unit in the second operating position, when the detection unit has detected that a pharmaceutical article which is reaching the end of the transport channel is defective;

to maintain the reject unit in the second operating position as long as the detection unit detects that a pharmaceutical article which is reaching the end of the transport channel is defective.

6. The apparatus as claimed in claim 5, wherein the linear driving actuator comprises a pneumatic or hydraulic alternating piston.

* * * * *